(12) United States Patent
Medvinsky

(10) Patent No.: US 7,266,198 B2
(45) Date of Patent: Sep. 4, 2007

(54) SYSTEM AND METHOD FOR PROVIDING AUTHORIZED ACCESS TO DIGITAL CONTENT

(75) Inventor: Alexander Medvinsky, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 11/281,019

(22) Filed: Nov. 17, 2005

(65) Prior Publication Data

US 2006/0107285 A1    May 18, 2006

Related U.S. Application Data

(63) Continuation-in-part of application No. 11/228,180, filed on Sep. 16, 2005.

(60) Provisional application No. 60/628,786, filed on Nov. 17, 2004.

(51) Int. Cl.
*H04N 7/167* (2006.01)

(52) U.S. Cl. .................. 380/200; 725/86; 725/87; 725/25; 713/168

(58) Field of Classification Search ........... 380/200; 725/86–87, 25; 713/168
See application file for complete search history.

(56) References Cited

U.S. PATENT DOCUMENTS

| | | | |
|---|---|---|---|
| 6,105,134 A * | 8/2000 | Pinder et al. ............... 713/170 |
| 2002/0044658 A1 * | 4/2002 | Wasilewski et al. ......... 380/239 |
| 2002/0174366 A1 * | 11/2002 | Peterka et al. ............ 713/201 |
| 2004/0101138 A1 * | 5/2004 | Revital et al. .............. 380/210 |
| 2005/0039212 A1 * | 2/2005 | Baran et al. ................ 725/91 |
| 2005/0144634 A1 * | 6/2005 | Koo et al. ................... 725/31 |
| 2006/0198519 A9 * | 9/2006 | Candelore .................. 380/239 |

* cited by examiner

*Primary Examiner*—Nasser Moazzami
*Assistant Examiner*—Fikremariam Yalew
(74) *Attorney, Agent, or Firm*—Larry T. Cullen

(57) ABSTRACT

Described herein are embodiments that provide an approach to cryptographic key management for a digital rights management (DRM) architecture that includes multiple levels of key management for minimizing bandwidth usage while maximizing security for the DRM architecture. In one embodiment, there is provided a data structure for cryptographic key management that includes a public/private key pair and three additional layers of symmetric keys for authorizing access to a plurality of contents.

20 Claims, 7 Drawing Sheets

SYSTEM AND METHOD FOR PROVIDING AUTHORIZED ACCESS TO DIGITAL CONTENT

PRIORITY

This application claims priority to U.S. Provisional Patent Application No. 60/628,786, filed: Nov. 17, 2004, entitled, "DVB TM-CBMS—CALL FOR TECHNOLOGIES," which is herein incorporated by reference in its entirety, this application is also a continuation-in-part of U.S. Utility patent application Ser. No. 11/228,180, filed Sep. 16, 2005, entitled, "SYSTEM AND METHOD FOR PROVIDING AUTHORIZED ACCESS TO DIGITAL CONTENT," which is herein incorporated by reference in its entirety.

BACKGROUND

Digital pay TV programming delivered to cable and satellite set top boxes (STBs) long have been provided with conditional access and digital rights management (DRM). As conventionally understood, conditional access refers to the control of access to particular transmission or broadcast, regardless of the specific content in such transmission or broadcast. PowerKEY of Scientific Atlanta and MediaCipher of Motorola are common examples of conditional access technologies. Also, as conventionally understood, DRM refers to the control of access to a particular content, regardless of the mode of transmission or broadcasting of such content.

One conventional approach to cryptographic key management of current DRM systems involves the delivery of a normally-static content decryption key to each receiver, such as a cable or satellite STB, whereby the content decryption key is encrypted with that receiver's public key and digitally signed by the service provider, such as the cable-TV (CATV) or satellite-TV service provider. The receiver then uses the content decryption key to decrypt and access the content provided by the service provider. This conventional approach provides an inadequate level of security for premium content because the same static content decryption key is used for a single piece of content. Thus, whenever a service provider broadcasts that content, it can be viewed by anyone that possesses the content decryption key associated with such content, which key may have been compromised and illegally distributed over the Internet or the like. The scope of such security breach is potentially infinite and terminated only after it is discovered, and the content is re-encrypted with a new content decryption key.

Another problem associated with the conventional key management approach is that it does not scale well enough to support broadcast systems. This is because public key cryptography used to deliver a content decryption key to each user is too slow and would require an operator to invest in large amounts of expensive hardware. This is especially problematic for Pay-Per-View (PPV) broadcasts, where millions of potential users will request access within a relatively short period of time.

SUMMARY

Accordingly, described herein are embodiments that provide an approach to cryptographic key management for a digital rights management (DRM) architecture that includes multiple levels of key management for minimizing bandwidth usage while maximizing security for the DRM architecture. In one embodiment, there is provided a data structure for cryptographic key management that includes a public/private key pair and three additional layers of symmetric keys for authorizing access to a plurality of contents.

BRIEF DESCRIPTION OF THE DRAWINGS

Embodiments are illustrated by way of example and not limited in the following figure(s), in which like numerals indicate like elements, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Figure 1:
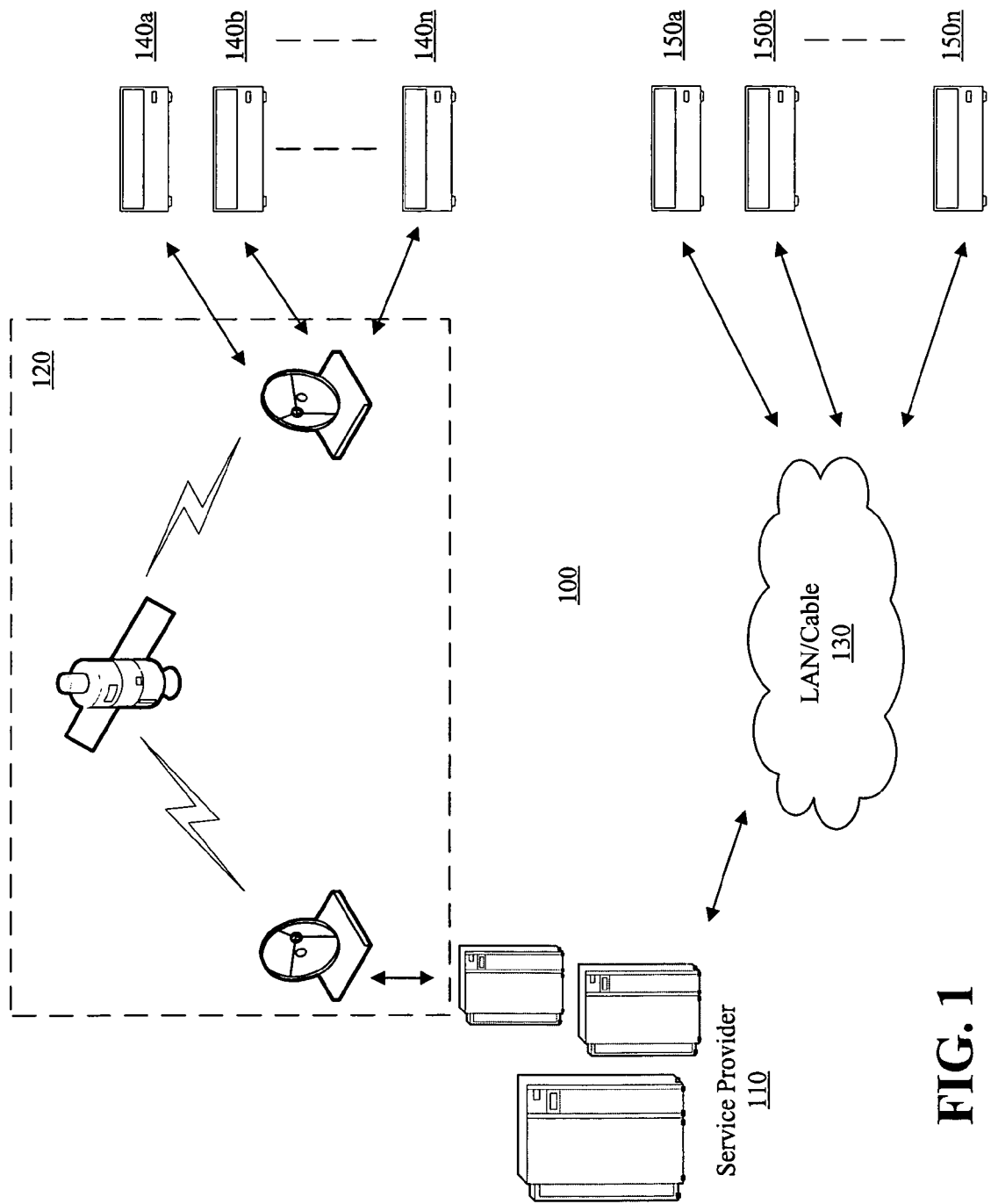
FIG. 1 illustrates a high-level view of a content distribution system 100 in accordance with one embodiment.

FIG. 1 illustrates a high-level view of a content distribution system 100 in accordance with one embodiment. The system 100 includes a service provider 110, a wireless transmission network 120 (such as a satellite transmission network), a landline transmission network 130 (such as a Land Area Network or a cable network), a plurality receivers 140a-140n and 150a-150n for users to receive content from the service provider 110 via the satellite transmission network 120. As referred herein, content provided to users includes any audio or video data or information, such as streamed audio services, streamed video services, streamed data services or DRM-protected files that are broadcast using a protocol such as FLUTE. As also referred herein, a user is an individual, a group of individuals, a company, a corporation, or any other entity that purchases, subscribes, or is authorized otherwise to receive access to one or more particular contents. Examples of users are but not limited to CATV subscribers, satellite TV subscribers, satellite radio subscribers, and Pay-Per-View (PPV) purchasers of PPV events. As also referred herein, a PPV event is a particular content for which a user is charged each time such content is accessed.

As further referred herein, a service provider is an individual, a group of individuals, a company, a corporation, or any other entity that distributes content to one or more users. Examples of service providers are CATV, satellite TV, satellite radio, and online music providers or companies. In turn, the service provider receives content from one or more content providers (not shown), such as film studios, record companies, television broadcasting networks, etc. It should be noted that a content provider is also operable as a service provider to directly provide its content to users in the same manner as shown for the service provider 110 in FIG. 1. As also referred herein, a receiver is a device that a user uses to access content provided by a service provider (or content provider), which content the user has authorization to access. Examples of receivers are CATV and satellite-TV STBs and satellite radio receivers. It should be noted that a receiver is operable as either a stand-alone unit or an integral part of a content-viewing device, such as a television with a built-in satellite or CATV receiver.

Figure 2:
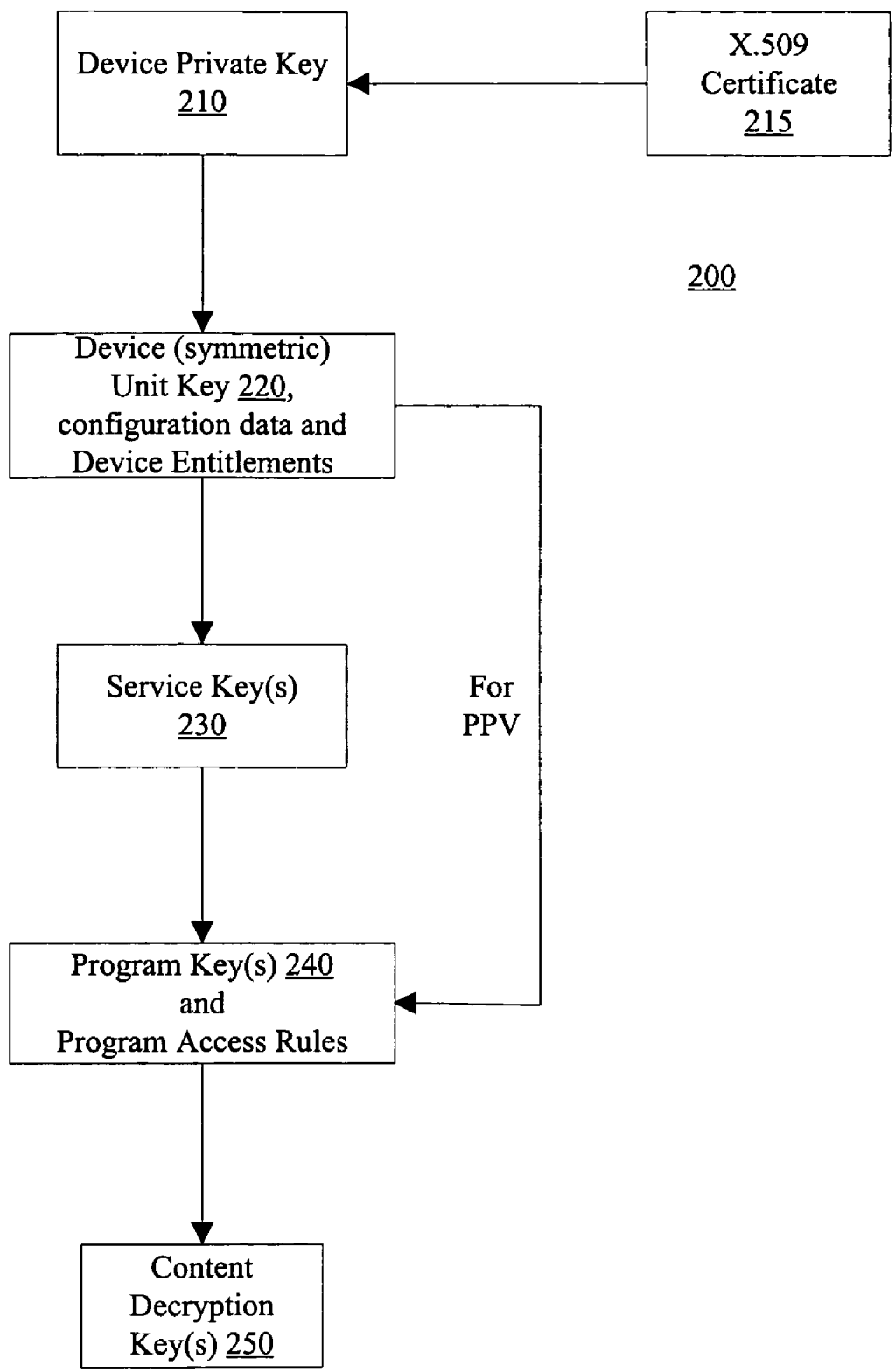
FIG. 2 illustrates a key management hierarchy for a DRM architecture in accordance with one embodiment.

FIG. 2 illustrates a key management hierarchy 200 for a DRM architecture that is capable of providing conditional access and DRM of content to a plurality of users. The DRM structure is operable as a computer-readable data structure encoded on a computer readable medium and scaleable to accommodate the users while minimizing bandwidth usage and without the addition of expensive hardware accelerators. The key management hierarchy 200 is operable in a one-way IP multicast environment, where there is no return path available from each receiver. However, alternative embodiments are contemplated in which the key management hierarchy 200 is also optimized for operation in a two-way IP multicast environment, wherein at least one or more receivers possess an ability to send upstream messages over IP to the service provider.

Referring to FIG. 2, each receiver possesses a unique public/private key pair, wherein a device private key 210 of the key pair is shown, and a corresponding digital certificate 115, such as a X.509 certificate, that has been issued by a certificate authority (CA) to verify that the public key from the public/private key pair belongs to the particular receiver. In a two-way IP multicast environment, the receiver sends up its digital certificate 115 to a service provider during a user's registration with a service provider. In a one-way IP multicast environment, rather than having the receiver sending up its digital certificate during registration, each CA publishes its X.509 certificates for receivers in an on-line directory or at any location that is accessible by service providers. Because the digital certificates contain only public information, no special security is required to access this directory.

The unique public/private key pair for each receiver is created from any public key algorithms. Examples of available public key algorithms include but are not limited to Rivest-Shamir-Adlerman (RSA), combination of El-Gamal and Digital Signature Algorithm (DSA), and Elliptic Curve. In one embodiment, Elliptic Curve is employed because its cryptographic performance increases linearly with key size. Thus, Elliptic Curve is capable of providing an adequate level of security with relatively smaller key sizes and less complexity.

As shown in FIG. 2, the top-level key in the key management hierarchy 200 is the aforementioned public/private key pair, as represented by the device private key 210. This asymmetric key operation is chosen over a symmetric key one for security reasons. For example, while having an on-line global database of symmetric keys poses a tremendous security problem and requires extreme security precautions, there are fewer security concerns in creating an on-line database of digital certificates (digital certificates are often treated as public information, whereas other information in a user database such as entitlements must remain secured from unauthorized access.) Additionally, public key systems provide standardized methods for expiring and revoking their associated digital certificates.

The next level in the key management hierarchy 200 is a device unit key 220. As with the device private key 210, the device unit key 220 is unique for each receiver. However, the device unit key 220 is symmetric, as opposed to asymmetric for the device private key 210. In one embodiment, the device unit key 220 includes multiple different unit keys for each receiver, with at least one key for encryption and one key for message authentication. Thus, the device unit key 220 includes multiple symmetric cryptographic algorithms, which are applicable for all symmetric-key levels in the key management hierarchy 200. For example, the device unit key 220 includes a 128-bit Advanced Encryption Standard (AES) key used for encryption and a 160-bit key-Hashed Message Authentication Code with specific hash function SHA-1 (HMAC SHA-1) key used for message authentication. During a user's registration with a service provider for content services, the service provider delivers the device unit key 220 along with device entitlements and other configuration data for the user's receiver. The device unit key 220 is encrypted with the public key from the public/private key pair prior to delivery, and it is decrypted by the device private key 210 from the public/private key pair upon receipt by the receiver.

The unique device unit key 220 for each receiver serves to reduce bandwidth usage and increases scalability for content security. For example, with purchased Pay-Per-View (PPV) events, unique program keys and access rules are delivered to each receiver requesting this PPV event and are thus encrypted with a unique device unit key 220 of each requesting receiver. Otherwise, each program key must be encrypted and digitally signed with public key encryption, and the process is repeated for each such receiver and each PPV content requested therein. Such heavy use of public key encryption requires high bandwidth usage between the service provider and the requesting receivers and causes scalability problems because it potentially and severely limits the number of receivers that can be authorized for the same PPV event. According to one embodiment, the device unit keys for all subscribing receivers are updated on a predetermined periodic basis, for example, once a year to minimize their possible compromises.

The next level below the device unit key 220 in the key management hierarchy 200 is one or more service keys 230 for each receiver. In one embodiment, service keys are utilized for subscription services instead of PPV events. Each service key 230 protects a single subscription service that is purchased as a unit by encrypting the content of such subscription service. As referred herein, a subscription service is any subscription for content that is other than a PPV event. Examples of a single subscription service include but are not limited to a single physical program channel, a portion of a program channel, or a collection of program channels that are all purchased as a unit. As further described later, each receiver periodically receives an Entitlement Management Message (EMM) that includes a set of one or more service keys, wherein the EMM is encrypted and authenticated with the receiver's unique device unit key 220. Various embodiments are contemplated wherein each EMM includes a single service key or multiple service keys.

As with all symmetric keys in the key management hierarchy 200, each service key 230 includes multiple keys, with at least one key for encryption (for example, AES) and one key for message authentication (for example, HMAC SHA-1). According to one embodiment, service keys for each receive are updated on a predetermined periodic basis (for example, once per each billing period) so that when a user drops a subscription service, the user's access to the dropped service is terminated cryptographically once the service keys are updated.

The next level below the service key 230 in the key management hierarchy 200 is the program key 240, which is created for each PPV event offered by the service provider, even if such event is also offered through a subscription service. According to one embodiment, each program key 240 is encrypted with a unique device unit key 220 and delivered to a subscribing receiver that is associated with the device unit key 220, along with one or more access rules. Examples of access rules include geographic restrictions (for example, blackouts), content ratings (that are compared by the receiver against an input parental rating ceiling), and copy control information (in a general case, this includes a full set of DRM rules that allow the content to be persistently stored on a Personal Video Recorder (PVR), also known as a Digital Video Recorder (DVR), and shared with other devices owned by a user, but with a list of restrictions, such as an expiration time; for non-persistent content this information is possibly desired to relay copy control bits for digital and analog outputs, such as Copy Guard Management System-Digital, or CGMS-D, and Copy Guard Management System-Analog, or CGMS-A). For events that are offered only through a subscription service, it remains desirable to send out access rules with a unique program key 240 on a per-program basis so that a recording device can save an individual program event along with the access rules and a program key 240 (rather than a service key 230 that is possibly used to access other encrypted content from the same subscription service that is not authorized to be recorded). Also, the use of a program key to authenticate access rules provides a replay protection tool—it is not possible to replay access rules from an old program event and have them pass as the access rules for the current event. Because the key management hierarchy 200 supports flexible and overlapping definitions of a subscription service, it is possible to distribute a same program key 240 under more than one service key 230.

The next level below the program key 240 in the key management hierarchy 200 is the content decryption key 150. According to one embodiment, the program key 240 is not actually used to directly decrypt the subscribed content. Instead, each content IP packet header includes a random value of a predetermined length (for example, 4 bytes). Such value is hereinafter referred to as a "Content Key ID" or "CKID," where ID stands for identification or identifier. The combination of the program key 240 and the CKID are input into a one-way hash function, such as HMAC SHA-1, to produce the content decryption key 150. Thus, content decryption keys are used to decrypt the actual content IP packets of the program event, and they change relatively frequently, for example, once per several seconds, based on a change in the CKID. The content decryption keys serve as control words in entitlement control messages (ECMs) as further described later.

By implicitly deriving each content decryption key 150 from a program key 240 and a CKID, the key management hierarchy 200 allows the content decryption key 150 to change more frequently and independent of the ECM update rates. A motivation for having a content decryption key 150, instead of relying on the program key 240 for the same purpose, is to have an extra key level wherein a key is changed very frequently. This frequent change allows additional security in DRM systems that use inexpensive security chips for key management but do not support content decryption due to, for example, insufficient processing power and inability to keep up with the rate of delivery of content packets.

It should be understood that the names for the various keys in the key management hierarchy 200 are merely used to differentiate those keys from one another in describing the various embodiments in the present disclosure. Therefore, it is possible to provide other names for the keys without deviating from the scope of the present disclosure. For example, it is possible to name the device private key 110, device unit key 120, the service key 130, etc. as first key, second key, third key, and so on.

According to one embodiment, the key management hierarchy 200 is implemented as a computer-readable data structure that is encoded securely on a smart card for insertion into the receiver. Due to possible processing limitations in the receiver, the smart card has to provide content decryption keys 150 to a general host processor or a video processor in the receiver that does not have the same level of physical security. Nevertheless, any piracy of the content decryption keys 150 is minimized because, as discussed above, the content decryption keys 150 are changed frequently. This frequent change forces any piracy of the content decryption keys 150 to include the breaking and redistribution in real time of thousands of content decryption keys at a high rate—making such attacks less practical and more easily detectable. As the rate of change of content decryption keys increases, piracy of such content decryption keys become increasingly less practical.

In another embodiment, such computer-readable data structure for the key management hierarchy 200 is encoded on a computer readable medium (CRM) that is secured in the receiver or securely accessible by the receiver. Embodiments of a CRM include but are not limited to an electronic, optical, magnetic, or other storage or transmission device capable of providing a processor in the receiver with computer-readable instructions. Other examples of a suitable CRM include, but are not limited to, a floppy disk, CD-ROM, DVD, magnetic disk, memory chip, ROM, RAM, an ASIC, a configured processor, any optical medium, any magnetic tape or any other magnetic medium, or any other medium from which a processor can read instructions.

Figure 3:
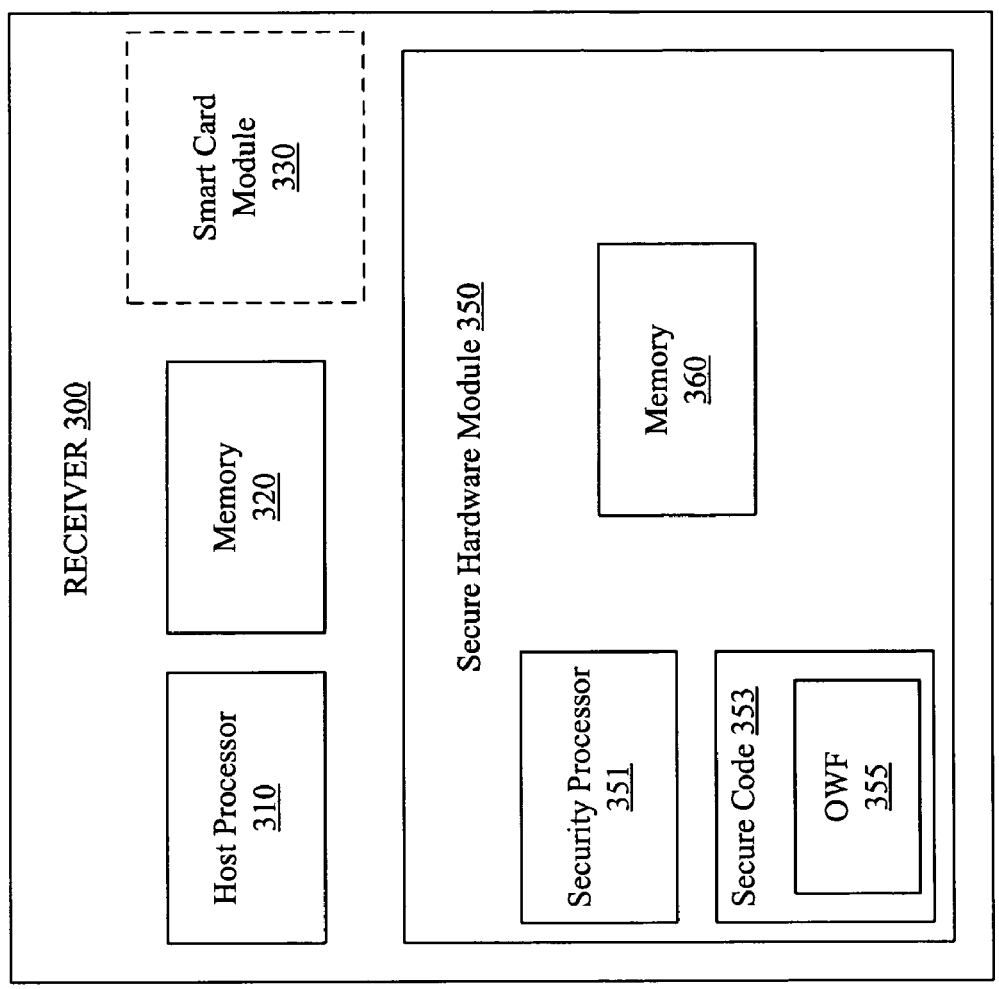
FIG. 3 illustrates a high-level configuration for a receiver in accordance with one embodiment.

FIG. 3 illustrates a high-level configuration of a receiver 300 which represents any one of the receivers 140a-n and 150a-n shown in FIG. 1, in accordance with one embodiment. The receiver 300 includes a host processor 310, a memory such as a CRM 320, an optional smart card module 330, and a secure hardware module 350. The host processor 310 is the component responsible for the majority of the receiver's functions, and it accesses the memory 320 for executable instructions to perform such functions. However, as mentioned earlier, the host processor is not a secure device and susceptible to tampering. Consequently, the host processor 310 usually handles only short-lived keys, such as the content decryption keys and CKIDs (hackers are primarily interested in longer lived components, such as device private keys, device unit keys, and service keys). The optional smart card module 330 is used to receive a smart card, on which is encoded a computer-readable data structure for the key management hierarchy 200, as mentioned earlier in accordance with one embodiment, for execution by the host processor 310. Alternatively, some or all data in the smart card is downloaded into the memory 320 for execution by the host processor 310.

The secure hardware module 350 contains a security processor 351, a secure code 353, and a memory such as a CRM 360. In one embodiment, the secure hardware module 350 is a secure silicon hardware device, such as a tamper resistant silicon microchip. The memory 355 is responsible for securely storing the channel key data 124. The security processor 351 is a secured processor that handles the processing functions for the secure hardware module 350, such as the execution of the one-way function (OWF) 355 (for example, the HMAC SHA-1 hash function) used to produce content decryption keys as described earlier. The secure code 353 is a portion of the secure hardware module 350 that comprises various software code and applications that is executed by the security processor. Notably, one secure code 353 includes the OWF 355. As described earlier, it is possible to implement the key management hierarchy 200 as a computer-readable data structure that is implemented on a CRM, such as the memory 360 in the secure hardware module 350. This ensures the security of the various encryption/decryption keys within the secure hardware module 350. In an alternative embodiment, the public/private key pair and associated digital certificate are stored on the smart card, and keys in the lower levels such as device unit key, service key, program key, and content decryption key are derived and stored in the memory 360.

Figure 4:
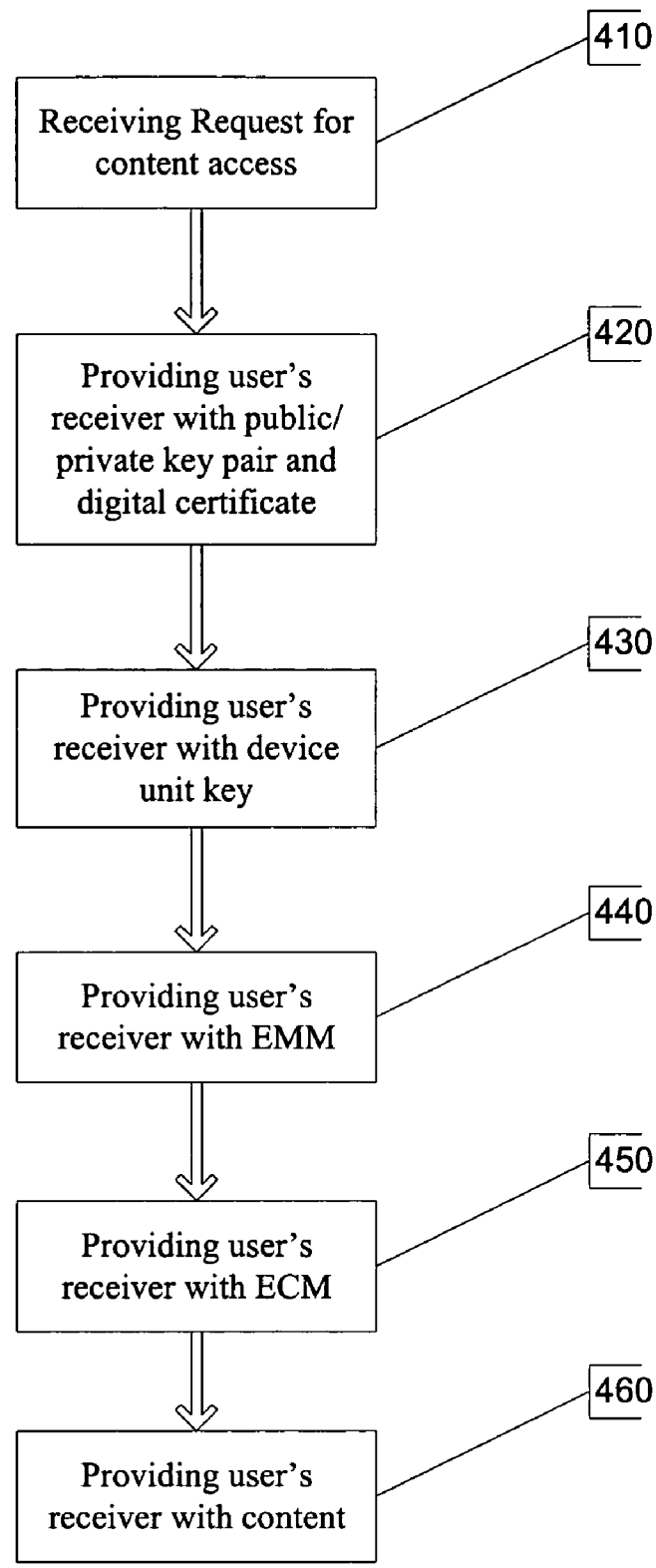
FIG. 4 illustrates a process flow for implementing the key management hierarchy illustrated in FIG. 1, in accordance with one embodiment.

The process for implementing the key management hierarchy 200 to provision conditional access and DRM of content to a plurality of users is now described with reference to FIG. 4, with further reference to FIG. 3. Beginning at 410, a service provider of content, such as digital-pay TV programming, receives a content request from a user. The service provider then registers the user in the usual manner, for example, by establishing the identity of the user, such as name and contact information provided by the user.

At 420, in one embodiment, as part of the registration, the user obtains a receiver from a service provider, whereby the receiver is provided with a unique public/private key pair and a digital certificate that have been pre-installed, for example, in a manufacturing facility, before any registration takes place between the user and the service provider. In this embodiment, the public/private key pair and corresponding digital certificate 115 are implemented in the receiver, secured in a smart card (for insertion into the smart card module 330) or CRM (such as memory 360) that is accessible for reading by the receiver as mentioned earlier. In another embodiment, the service provider effects a physical delivery to the user of a smart card or CRM on which is stored a public/private key pair and digital certificate so that the user's receiver is provided with access to the stored information. In still another embodiment, a service provider provides the public/private key pair and digital certificate by remotely installing into a user's receiver (for example, in the memory 360) through a landline data network (such as the Internet), a wireless data network (such as a cellular network), or a combination of landline and wireless data networks.

Accordingly, the user's receiver is provided with the private/public key pair and digital certificate prior to the provisioning process illustrated in FIG. 2, which is further described below.

At 430, also as part of the registration, the service provider provides the user a unique device unit key 220 (FIG. 2) for the user's receiver and optionally—device configuration data and general entitlements that are not specific to a particular content access service (for example, for storage in either the memory 320 or 360). The device unit key 220 is delivered encrypted with the public key and decrypted inside the receiver (for storage in the memory 360) with the corresponding private key of the unique public/private key pair of the receiver as described earlier.

At 440, to provision the user with any content access service, the service provider first transmits an entitlement management message (EMM) to the user's receiver to specify the user's entitlements to the content access service. The EMM is transmitted to the receiver by landline connection, (for example, in the case of CATV programming) or wireless connection (for example, in the case of satellite TV or radio programming). The EMM is encrypted as well as authenticated with the device unit key 220 unique to the receiver and includes, service entitlements for the receiver (for example, for storage in the memory 320), and one or more service keys 230 (for example, for storage in the memory 360) for any subscription services. As mentioned earlier, because service keys 230 and device unit keys 120 change over time, each EMM also includes a key identifier to serve as a label. According to one embodiment, all EMMs intended for a particular receiver are further mapped to a single IP multicast address for transmission to such receiver. The mapped IP multicast address is separate from other IP multicasts utilized for sending content and other types of key management messages. Each EMM has a header that includes: a) a message type indicating it to be an EMM; b) a device ID (for example, 5 bytes or longer) identifying the receiver for which the EMM is intended; c) an identifier of the device unit key 220 used to encrypt the EMM (for example, 4 bytes) which is to be incremented by one after each change of the device unit key 220; and d) a message authentication code (MAC) to verify message integrity, wherein the MAC is a symmetric key such as an HMAC SHA-1 key truncated to 12 bytes to preserve bandwidth.

At 450, the service provider next transmits an entitlement control message (ECM) to the user's receiver to specify keys for decrypting authorized content. Thus, ECMs are messages that carry program keys 240 and access rules, encrypted under a service key 230 (for a subscription service) or a device unit key 220 (for a PPV event). A new ECM encrypted with a service key 230 and carrying access rules and a unique program key 240 is broadcast for each program event included in a subscription service, regardless whether such program event is also available as a PPV event.

According to one embodiment, an ECM has several different delivery/encryption modes. In a first mode, when an ECM is delivered for a subscription service, it is encrypted and authenticated with a service key 230 and is sent out over a broadcast or an IP Multicast. Thus, all users that are authorized for such subscription service are able to receive and decrypt that ECM. In a second mode, when an ECM is delivered for a PPV event, it is encrypted and authenticated with a device unit key 220. When such PPV event is also available in a subscription service, the ECM is still encrypted and authenticated with a device unit key 220 because the receiver for which the PPV event is intended is not authorized to receive the corresponding service key 230 for such subscription service. Thus, the key management hierarchy 200 also supports the ability of a user to purchase additional rights for a single event, such as "buy-through blackouts" in an on-demand fashion.

Referring back to FIG. 4, at 460, the service provider next transmits the content in individual data packets that have been encrypted with a symmetric key. In one embodiment, the content is encrypted with 128-bit AES in CBC mode. Content encryption is preferably applied at an application layer in a service provider's system, as opposed to the use of IP security (IPsec) for layer 3 encryption. This reduces the bandwidth overhead that is otherwise imposed by IPsec headers and also reduces the reliance of the content security system on the underlying operating system. Each encrypted individual content packet includes an application-layer header with at least the following information: a CKID as described earlier, an initialization vector (IV) needed for CBC encryption mode and a program ID (or some other type of identifier for the program key 240). An IV for AES is typically 16 bytes, but in order to conserve bandwidth, it is possible to derive the IV through a one-way hash function (e.g., SHA-1) from a smaller number of bytes, such as 4 bytes. The program ID points to a corresponding program key 240 and entitlements. As mentioned earlier, the program key 240 is combined with the CKID to derive the content decryption key 150.

Figure 5:
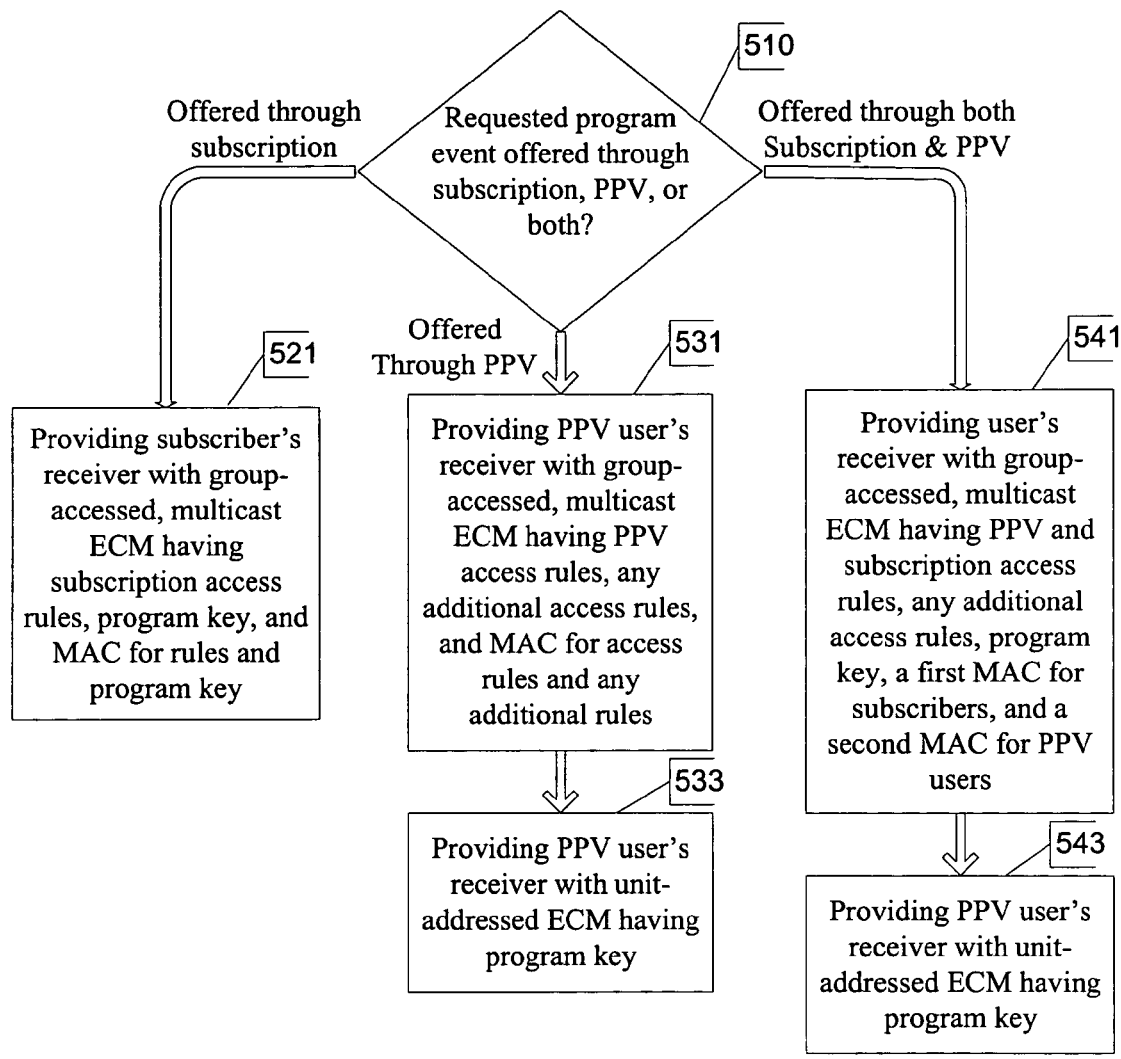
FIG. 5 illustrates a detailed process flow for the key management hierarchy illustrated in FIG. 2, in accordance with one embodiment.

As described above, when a plurality of users request the same PPV event, each of the requesting users receives a unit-addressed ECM (that is, an ECM specific for each user's receiver) that carries common access rules for such PPV event. Thus, the total amount of bandwidth taken up by all the unit-addressed ECMs can substantially increase due to multiple duplications of common access rules. Consequently, additional time is required to enable all users that request the same PPV event. Accordingly, in one embodiment, to optimize the aforementioned bandwidth and time overhead requirements, access rules for a requested PPV event are delivered in a group-addressed, multicast ECM to all requesting users, wherein the group-addressed, multicast ECM is separate from the unit-addressed ECMs. This embodiment is described next with reference to FIG. 5, which illustrates a process flow for the block 450 in FIG. 4.

The type of group-addressed, multicast ECMs that is sent to the requesting users depends on the type of program event requested by the user. Thus, at 510, the service provider determines whether the requested program event is offered through a subscription service, a PPV service, or both.

At 521, if the requested program event is offered through only a subscription service, the service provider transmits to the requesting users (hereinafter, "subscribers") a group-addressed, multicast ECM that carries the access rules for the requested program event, a program key 240 encrypted with a service key 230, and a MAC over at least the encrypted program key 240 and the access rules, whereby the MAC is a symmetric key derived from the service key 230.

At 531, if the requested program event is offered through only a PPV service, the service provider transmits to the requesting users (hereinafter, "PPV users") a group-addressed multicast ECM that carries the common access rules for the requested program event, any additional access rules (delta access rules) or options that are purchasable via the PPV method, even for already registered subscribers, and a MAC over at least the access rules and any additional access rules, whereby the MAC is a symmetric key derived from the program key 240. Because the group-addressed multicast ECM does not contain any program key for a PPV service, at 533 the service provider further transmits to each of the PPV users a separate unit-addressed ECM that contains the necessary program key 240, encrypted with the corresponding device unit key 220, whereby the unit-addressed ECM no longer carries the common access rules or any additional access rules in order to optimize the bandwidth usage and time overhead for the PPV users.

At 541, if the requested program event is offered through both subscription and PPV services, the service provider transmits to all requesting users, subscribers and PPV users alike, a group-addressed multicast ECM that carries those fields needed for both subscription and PPV services. Thus, the group-addressed multicast ECM carries the common access rules for the requested program event, any additional access rules for the PPV users, a program key 240 encrypted with a service key 230 for the subscribers, a first MAC over at least the encrypted program key 240 and the common access rules for the subscribers, and a second MAC over at least the common access rules and any additional access rules. The first MAC is derived from the service key 230 for the subscribers. The second MAC is derived from the program key 240 for the PPV users. Therefore, each of the requesting users receiving the group-addressed multicast ECM is able to verify a different MAC depending on whether the particular requesting user is a subscriber or a PPV user. At 543, the service provider further transmits to each of the PPV users a separate unit-addressed ECM that contains the necessary program key 240, encrypted with the corresponding device unit key 220, whereby the unit-addressed ECMs no longer carries the common access rules or any additional access rules in order to optimize the bandwidth usage and time overhead for the PPV users.

In another embodiment, to further reduce the ECM bandwidth used to transmit the common access rules, it is possible to divide or categorize the common access rules into two groups: a first group of access rules that are required to be sent in a group-accessed, multicast ECM to the users at a higher rate (an example of such an access rule includes content rating), and a second group of access rules that may be sent in a group-accessed, multicast ECM to the users at a slower rate (an example of such an access rule includes recording permission, whereby it is acceptable for a user to record a few seconds of a program event before an access rule is sent to prohibit any further recording). Thus, the full set of common access rules, including the first and second groups of access rules, may be sent in a group-accessed multicast ECM to the users at a slower rate, and the first group of access rules may be sent in an additional group-accessed multicast ECM at a faster rate.

In order to facilitate seamless transition from one service key 230 to the next (for example, for the same service but with different expiration dates), an EMM is operable to include both the current and the next service key. When a switch to the next service key is scheduled, at some predetermined time before that next service key is used the EMM is repeated with both the current and the next service key present with their corresponding key IDs. Once the switch is made, the current service key is expired, and the next service key becomes current and the following next service key does not need to be included, until desired.

The same scheme applies to key changes scheduled for device unit keys 120. However, this scheme does not apply to program keys 240. Instead of a concept of a current or next key, a program key 240 simply corresponds to a specific PPV event ID, and the receiver keeps a list of all program keys that it has received for all non-expired PPV events.

Because an IP multicast transport is not assumed to be reliable and there is no guarantee of a return path, EMMs and ECMs are periodically re-transmitted to the receiver. To further minimize message bandwidth utilization, EMMs and ECMs may be efficiently formatted with a simple binary encoding method, such as MIKEY (IETF RFC 3830), which is an Internet Engineering Task Force (IETF) standard for an application layer key management that is applicable to an IP multicast. A complete MIKEY description and specification is found, for example, in *MIKEY: Multimedia Internet KEYing*, RFC 3830, J. Arkko, E. Carrara, F. Lindholm, M. Naslund, K. Norman, August 2004.

According to a further embodiment, EMMs include additional entitlements that provide information such as a domain ID, a domain key and domain restrictions (e.g., limit on the number of devices) in order to address personal domains over which content are shared on multiple devices. The key management protocol that provides content security over a personal domain is typically point-to-point two-way over IP. Thus, such protocol does not need to use the same key management hierarchy 200 that protects the initial content delivery.

Each ECM stream corresponding to a separate content service, be it a subscription service or a PPV event, is mapped to a separate IP multicast address, which is also separate from the corresponding IP content address. This allows the filtering and separation of ECM packets from content packets to be performed efficiently at the IP layer of the receiver to support rapid channel acquisition. An ECM carrying an encrypted program key 240 is formatted the same way as described earlier; that is, each program key 240 simply corresponds to a specific PPV event ID, and the receiver keeps a list of all program keys that it has received and with associated program events that are non-expired.

According to one embodiment, as an additional enhancement, ECMs for many services are transmittable in a single background low-rate multicast IP stream. As device memory permits, ECMs are pre-acquired and stored to further reduce channel acquisition time.

Figure 6:
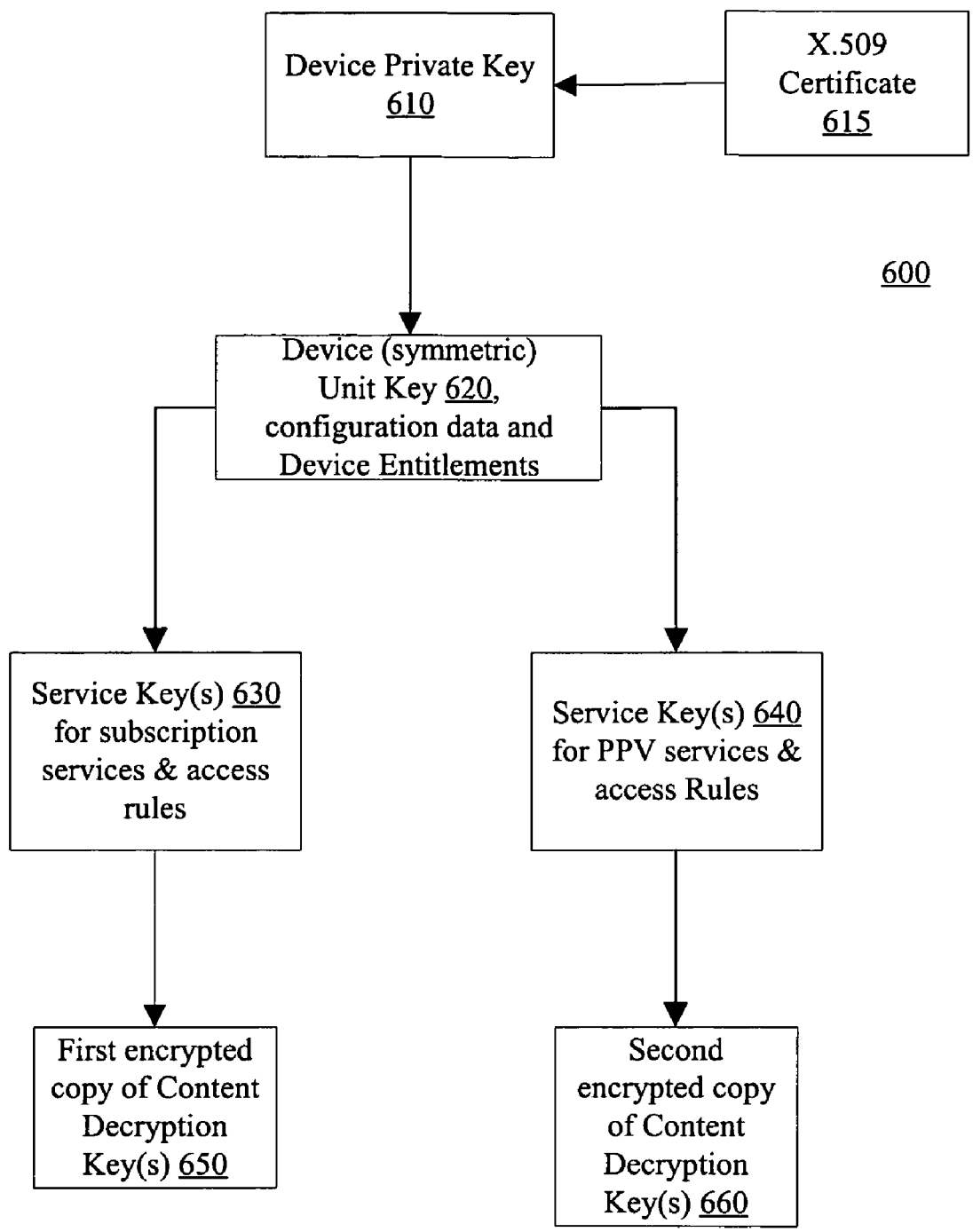
FIG. 6 illustrates an alternative key management hierarchy for a DRM architecture in accordance with one embodiment.

FIG. 6 illustrates an alternative embodiment of a key management hierarchy 600 for a DRM structure that does not employ program keys 240. The DRM structure is operable as a computer-readable data structure encoded on a computer readable medium. In this embodiment, the device unit key 610, the digital certificate 615, and the device unit key 620 operate as described earlier for the device unit key 210, the digital certificate 215, and the device unit key 220, respectively, in the key management hierarchy 200 (FIG. 2). However, without a program key, two different service keys are now used to encrypt a content decryption key, as opposed to having the content decryption key derived from a program key and a CKID as described earlier. Thus, the content decryption key may be sent in a group-addressed ECM to a user's receiver.

Accordingly, as shown in FIG. 6, in the case of a subscription-only service, the service provider first transmits an EMM to all subscribers, wherein the EMM includes a subscription service key 630 for the subscription service. The EMM includes other information and functions as described earlier for the EMM used for the key management hierarchy 200 in FIG. 2. The service key 630 operates as described earlier for the service key 230 in FIG. 2. Next, the service provider transmits to all subscribers a group-addressed, multicast ECM that includes common access rules and a copy of the content decryption key 650 encrypted with the subscription service key 630.

In the case of a PPV-only service, the service provider first transmits an EMM to the user's receiver, wherein the EMM includes a PPV service key 640 for the PPV service. This EMM otherwise includes other information and functions as described earlier for the EMM used for the key management hierarchy 200 in FIG. 2. The PPV service key 640 operates similarly to the subscription service key 630, except that the PPV service key 640 has a lifetime corresponding to the PPV program event rather than to the subscription service, and each PPV user does not automatically get the next PPV service key 640 unless the PPV user purchases another PPV program event. Next, the service provider transmits to all PPV users a group-addressed, multicast ECM that includes common access rules and a copy of the content decryption key 660 encrypted with the PPV service key 640.

In the case of a program event that is available both through a subscription service and as PPV event, the service provider transmits two different EMMs, one with the subscription service key 630 for the subscribers and one with the PPV service key 640 for the PPV users. Next, the service provider transmits to both the subscribers and the PPV users a group-addressed, multicast ECM that includes common access rules and two different copies 650 and 660 of the same content decryption key (encrypted with two different service keys). Thus, for optimization of ECM bandwidth and time overhead, two encrypted copies 650 and 660 of the same content decryption key are included in the same group-accessed, multicast ECM for transmission to both subscribers and PPV users to avoid duplication of access rules (PPV users may have additional access rules included in the multicast ECM, as further described below).

Referring back to FIG. 3, as with the key management hierarchy 200 (FIG. 2), it is possible to implement the key management hierarchy 600 as a computer-readable data structure that is implemented on one or more CRMs, such as the memory 360 in the secure hardware module 350. Again, this ensures the security of the various encryption/decryption keys within the secure hardware module 350. In an alternative embodiment, the public/private key pair and associated digital certificate are stored on the smart card, and keys in the lower levels such as device unit key, the two different service keys, and content decryption key are derived and stored in the memory 360.

Figure 7:
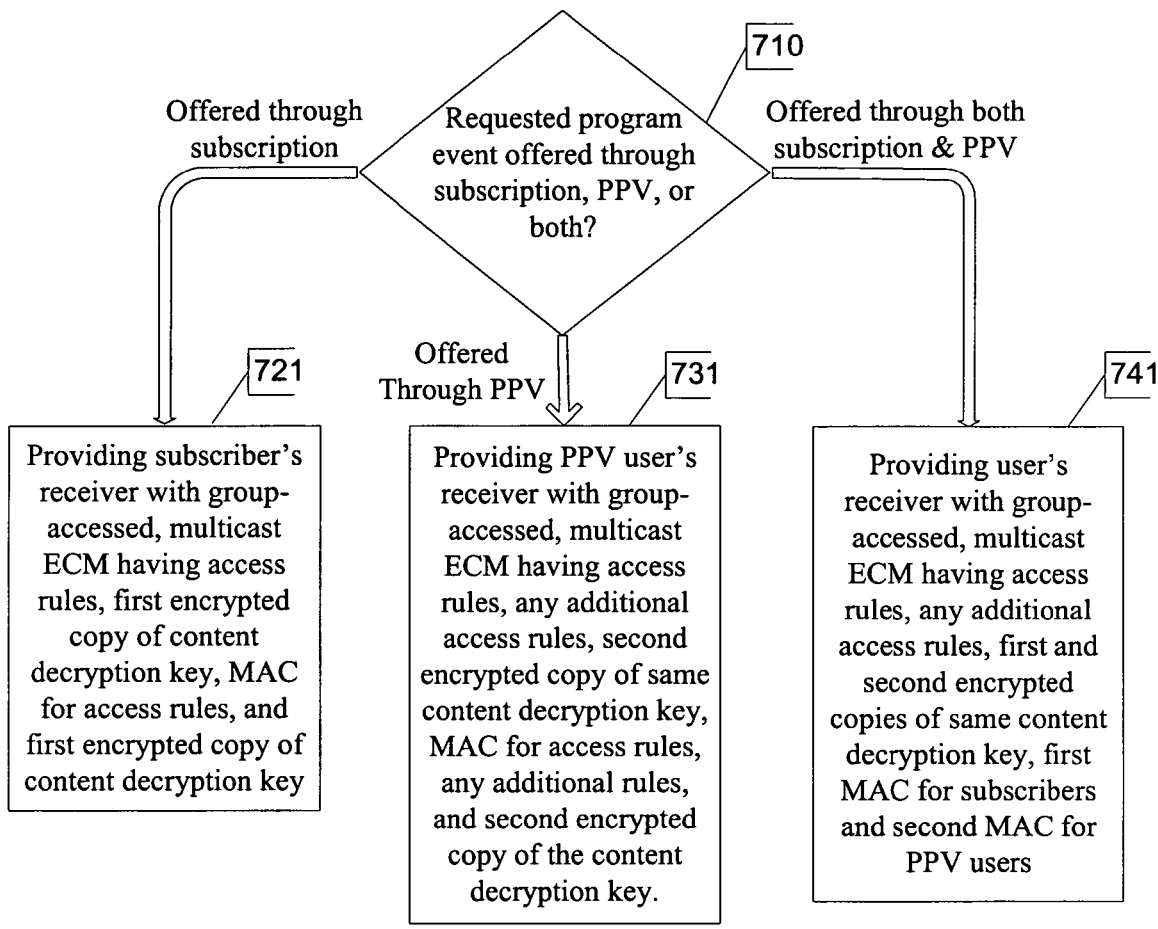
FIG. 7 illustrates a detailed process flow for the alternative key management hierarchy illustrated in FIG. 6.

FIG. 7 illustrates a process flow for the delivery of group-addressed, multicast ECMs without program keys to users based on the type of program event requested by the users. At 710, it is determined whether the requested program event is offered through a subscription service, a PPV service, or both. At 721, if the requested program event is offered through a subscription-only service, the service provider transmits to the subscribers a group-addressed, multicast ECM that carries the common access rules for the requested program event, a first copy 650 of the content decryption key encrypted with a subscription service key 630, and a MAC over at least the subscription content decryption key 650 and the access rules, whereby the MAC is a symmetric key derived from the subscription service key 630.

At 731, if the requested program event is offered through a PPV-only service, the service provider transmits to the requesting PPV users a group-addressed multicast ECM that carries the common access rules for the requested program event, any additional access rules (delta access rules) or options that are purchasable by the requesting users, even if they are already PPV users, a second copy 660 of the same content decryption key encrypted with a PPV service key 640, and a MAC over at least the access rules and any additional access rules, whereby the MAC is a symmetric key derived from the PPV service key 640.

At 741, if the requested program event is offered both through a subscription service and as a PPV event, the service provider transmits to all requesting users, subscribers and PPV users alike, a group-addressed multicast ECM that carries those fields needed for both subscription and PPV services. Thus, the group-addressed multicast ECM carries the common access rules for the requested program event, any additional access rules as mentioned earlier for PPV users, first and second encrypted copies 650 and 660 of the same content decryption key, a first MAC over at least the common access rules and the first encrypted copy 650 of the content decryption key for the subscribers, and a second MAC over at least the common access rules, any additional access rules, and the second encrypted copy 660 of the same content decryption key for the PPV users. The first MAC is a symmetric key derived from the subscription service key 630, and the second MAC is a symmetric key derived from the PPV service key 640. Consequently, each of the requesting users receiving the group-addressed multicast ECM is able to verify a different MAC depending on whether the particular requesting user is a subscriber or a PPV user. Subscribers and PPV users also use their own service keys 630 and 640, respectively, to decrypt the appropriate copy of the encrypted content decryption key.

According to one embodiment, the key management hierarchies illustrated in FIGS. 2 and 6 are operable to provide content access to roaming mobile receivers. In the case of a mobile multicast, roaming refers to a user carrying a mobile receiver outside a predefined service area and into a different area ("roaming area") where the user cannot receive broadcasting (subscription or PPV) services from a service provider with whom the user subscribes, but where there is an alternate local service provider. Thus, the visiting mobile receiver is temporarily provisioned to receive broadcasting in the roaming area from the local service provider. Roaming also refers to a user entering an area ("roaming area") wherein the user is not provisioned to receive broadcasting (subscription or PPV) services and is unable to automatically receive and decrypt ECMs, even though the user is actually authorized for services in the roaming area (for example, the roaming area is covered by a different network that is operated by the same service provider). When the user is in a roaming area, the user can contact the local service provider that services the roaming area in order to temporarily receive entitlements. This can be done interactively if the user's mobile receiver has a two-way communication capability. Alternatively, the user can contact the local service provider by phone.

Once the user is verified and authorized by the local service provider in the roaming area to receive services therein, the local service provider transmits to the user's receiver an EMM with a roaming device unit key for roaming services that is encrypted with the public key from the receiver's public/private key pair as described earlier. As mentioned earlier, it is possible for the local service provider to locate a corresponding digital certificate for the receiver's public/private key (based on the receiver's device ID) from a globally accessible certificate directory. Consequently, the user is able to receive EMMs and ECMs for roaming services with the user's receiver as if the user is a regular subscriber, except that the receiver is to receive short-term service keys (for example, good for only a day) in the EMM for roaming subscription services. Accordingly, to support roaming receivers, the local service provider generates two separate sets of ECMs: a) a normal set of ECMs having program keys encrypted with regular service keys for regular users with subscription services in the area, and b) a separate set of roaming ECMs having program keys encrypted with the aforementioned short-term service keys for roaming users with subscription services in the area. In addition, a roaming user is able to request or purchase a PPV event, whereby the user's receiver is to receive ECMs having program keys that are encrypted with the receiver's roaming device unit key instead of the long term unit keys. Optimization of ECM bandwidth and time overheads as described earlier are applicable here as well.

Because no assumption is made with regard to the security of the service provider's IP network that is used to communicate between the various network servers involved in the generation and transport of EMMs and ECMs, it is possible that such messages are subject to unauthorized recording or capture within such IP network. Previously transmitted and captured EMMs are then usable to create significant denial of service problems to a user, especially when the service key 230 and device unit key 220 of the user's receiver is not frequently changed (for example, once a month for the service key 230 and once a year for the device unit key 220). When a previously-captured EMM is later re-inserted into an IP broadcast stream, such as an IP multicast stream used for the transmission of the EMM, the receiver is re-initialized with an old and obsolete device unit key 220 or service key 230 that disables the receiver's ability to receive and successfully decrypt subsequent key management messages. Thus, according to one embodiment, replay protection for EMMs is provided by sequentially increasing the key identifiers for the device unit key 220 and using the MAC to provide message integrity. For example, when a receiver detects that a particular EMM contains a key identifier that is smaller than the last one received, such EMM is dropped and ignored as a potential replay attack. A legitimate sender of EMMs never decrements a key identifier that is encrypted under the same device unit key 220.

As discussed earlier, device unit key 220 and service key 230 are not frequently changed. Thus, a 4-byte key identifier is not going to roll over to 0 for thousands of years, and there is no ground for concern as to what happens when a key identifier rolls over to 0. However, to avoid any accidental errors when a key identifier is set for some reason to FFFF, it is possible to program a receiver to verify that the new key identifier has not jumped from the previous value by more than some reasonable amount (for example, 100).

According to one embodiment, it is possible for a service provider to leverage the key management hierarchy 200 for increased scalability by offering users with a content purchase model called store and forward PPV or Impulse PPV (IPPV), wherein all participating receivers are sufficiently physically secure that they are trusted with a program key, even before any of the content on that IPPV service had been purchased. Each receiver is then tasked to record locally at the receiver which IPPV programs a user actually chooses to view and periodically report these purchases to the service provider's billing system, which then charges the user accordingly. This IPPV model is applicable for receivers with a return path.

Thus, with the key management hierarchy 200, IPPV is easily enabled by allowing all users to subscribe to IPPV services for free. At the same time, any local purchases of program events or services made on an IPPV service are recorded inside the receiver, and the cumulative set of purchases are then reported back to the service provider. Of course, a 2-way point-to-point secure protocol is desired between the each receiver and the service provider's host system for the latter to query each receiver for a list of IPPV purchases that had been made within a predetermined past time period, for example, the last billing period. Also, it is possible to program code a receiver to impose a limit on a number of IPPV purchases that can be made or a total overall "cash spent" amount until the receiver reports the full list of purchases to the service provider. To support IPPV services for receivers that do not necessarily have a return path capability, it is possible for users associated with those receivers to pre-purchase credit from a kiosk. Once the credit is used, a user is able to return to a kiosk, to report back purchases, and to buy more credit.

According to one embodiment, the key management hierarchies 200 and 600 are operable to support free previews for PPV programs. In such an embodiment, the service provider transmits a free-preview program key to each user's receiver in an EMM shortly after registration. The distribution of free-preview program keys is based on one more authorization criteria, such as age or geographical location. When a free preview takes place, the service provider transmits free-preview content data packets to the users on a corresponding channel (IP multicast address). Each free-preview content packet includes an application-layer header having at least a free-preview program ID (or some other type of identifier for the free-preview program key). Thus, all receivers authorized for free previews are capable of decrypting the free-preview content packets with a key derived from the free-preview program key, which is identified by the free-preview program ID in the packet headers. Once the free preview ends, the service provider can transmit content packets that are not for free preview to indicate a different program ID, which then requires a program key that is obtained through a subscription, PPV, or IPPV purchase, based on the mechanisms described earlier.

According to another embodiment, if program access rules are allowed to include secure or authenticated time services restrictions, such as "content may be recorded on a PVR and used locally for a limited period of time," it is possible for the receiver to secure a source of time so that the temporarily stored content is set to securely expire. To achieve this scheme, time messages or packets are repeatedly sent to a specific IP multicast address for the receiver that has the capability to persistently store content programming, such as a PVR or DVR. Each time message includes a timestamp of a predetermined length (for example, 4 bytes) in UTC time, a sequence number, and a digital signature such as RSA or ECDSA.

The receiver is then provisioned (for example, in an EMM Message) with both the current sequence number and a certificate chain of the time server in order to validate each time message. A sequence number in one time message must be greater than or equal to the one from a previous time message. In cases where the sequence number is the same, the newer timestamp must be greater than or equal to the last one received. Thus, this sequence number is operable for making backward time adjustments as desired or required. As long as the timestamps are strictly incrementing, there is no need to ever change this sequence number.

If a significant number of receivers have access to a return path, then additional improvements in scalability and content acquisition times are achievable. As long as the 2-way capability of each receiver is known to the service provider, the periodically repeating streams of EMMs and unit-addressed ECMs do not need to include any messages addressed to those 2-way receivers. A receiver with a 2-way capability is operable to send an upstream message to request its EMM or unit-addressed ECM and wait for the response to come back. If the response does not come back due to an unreliable transport, the receiver is operable to retry after a predetermined time-out period. As long as the service provider does not see an explicit request from a 2-way receiver, the service provider does not need to multicast any messages that are specifically encrypted for that device.

What has been described and illustrated herein are various embodiments along with some of their variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A method for providing authorized access to content, comprising the steps of:
   receiving a PPV access request for content from a plurality of PPV users;
   responsive to the PPV access request, providing an asymmetric key pair having a public encryption key and a private encryption key to each of the plurality of PPV users;
   providing a unique device unit key for each of the plurality of PPV users, wherein each of the device unit key is encrypted with the public encryption key associated with the each PPV user;
   providing a first entitlement control message (ECM) for the PPV access request, the step of providing the first ECM includes,
      a) providing PPV access rules for the PPV access request in the first ECM;
      b) providing a first message authentication code (MAC) for at least the PPV access rules in the first ECM; and
      c) providing the first ECM as a group-addressed, multicast ECM to the plurality of PPV users; and furthermore,
   providing a second ECM for the PPV access request, wherein the step of providing the second ECM includes,
      a) encrypting a first copy of a program key with the device unit key, the program key is operable for decrypting the content for the PPV access request and deriving the first MAC; and
      b) providing the first copy of the program key in the second ECM.

2. The method of claim 1, further comprising the step of:
   providing the second ECM as a unit-addressed ECM to each of the plurality of PPV users, wherein the unit-addressed ECM includes a program key encrypted with the device unit key that is unique to each of the PPV users.

3. The method of claim 1, further comprising the steps of:
   receiving a subscription-service access request for the content; and
   responsive to the subscription-service access request, providing an entitlement management message (EMM), the step of providing the EMM includes,
      a) encrypting a service key with a device unit key that is unique to a source of the subscription-service access request, the service key is operable to provide encryption and decryption of the program key; and
      b) providing the service key in the EMM.

4. The method of claim 3, wherein responsive to the subscription-service access request, the step of providing the first ECM further includes:
   c) providing subscription-service access rules for the subscription-service access in the first ECM;
   d) encrypting a second copy of the program key with the service key;
   e) providing the second copy of the program key in the first ECM; and
   f) providing a second MAC for at least the subscription service access rules and the second copy of the program key, the second copy of the program key is operable for decrypting the content for the subscription-service access and deriving the second MAC.

5. The method of claim 1, wherein the step of providing PPV access rules for the PPV access request in the first ECM comprises the steps of:
    providing a predetermined subset of the PPV access rules for the PPV access request in the first ECM at a first rate; and
    providing a remainder of the PPV access rules in the first ECM at a rate slower than the rate of providing the predetermined subset of the PPV access rule.

6. The method of claim 1, further comprising the steps of:
    receiving a roaming request for the content, wherein the roaming request is a roaming PPV access request or a roaming subscription-service access request; and
    responsive to the roaming request, providing a roaming device unit key that is unique to a source of the roaming request.

7. The method of claim 6, further comprising the step of:
    responsive to the roaming request being the roaming PPV access request, providing a roaming ECM, the step of providing the roaming ECM includes,
        a) encrypting a roaming program key with the roaming device unit key, the roaming program key is operable for decrypting the content for the PPV access request through roaming; and
        b) providing the roaming program key in the roaming ECM.

8. The method of claim 6, further comprising the step of:
    responsive to the roaming request being the subscription-service access request, providing a roaming EMM, wherein the step of providing the roaming EMM includes,
    c) encrypting a roaming service key with at least the roaming device unit key; and
    d) providing the roaming service key in the roaming EMM.

9. The method of claim 8, further comprising the step of:
    responsive to the roaming request being the subscription-service access request, providing a roaming ECM, the step of providing the roaming ECM includes,
        a) encrypting a roaming program key with the roaming service key, the roaming program key is operable for decrypting the content for the subscription service access through roaming; and
        b) providing the roaming program key in the roaming ECM.

10. The method of claim 1, further comprising the step of:
    providing an entitlement management message (EMM) that includes a free-preview program key, wherein the free-preview program key is operable to enable a free preview of the content by the PPV access request.

11. Computer-readable media tangibly embodying a program of instructions executable by a computer to perform a method for providing authorized access to content, the method comprising the steps of:
    receiving a PPV access request for content from a plurality of PPV users;
    responsive to the PPV access request, providing an asymmetric key pair having a public encryption key and a private encryption key to each of the plurality of PPV users;
    providing a unique device unit key for each of the plurality of PPV users, wherein each of the device unit key is encrypted with the public encryption key associated with the each PPV user;
    providing a first entitlement control message (ECM) for the PPV access request, the step of providing the first ECM includes,
        a) providing PPV access rules for the PPV access request in the first ECM;
        b) providing a first message authentication code (MAC) for at least the PPV access rules in the first ECM; and
        c) providing the first ECM as a group-addressed, multicast ECM to the plurality of PPV users; and furthermore,
    providing a second ECM for the PPV access request, wherein the step of providing the second ECM includes,
        a) encrypting a first copy of a program key with the device unit key, the program key is operable for decrypting the content for the PPV access request and deriving the first MAC; and
        b) providing the first copy of the program key in the second ECM.

12. The method of claim 11, further comprising the step of:
    providing the second ECM as a unit-addressed ECM to each of the plurality of PPV users, wherein the unit-addressed ECM includes a program key encrypted with the device unit key that is unique to each of the PPV users.

13. The method of claim 11, further comprising the steps of:
    receiving a subscription-service access request for the content; and
    responsive to the subscription-service access request, providing an entitlement management message (EMM), the step of providing the EMM includes,
        a) encrypting a service key with a device unit key that is unique to a source of the subscription-service access request, the service key is operable to provide encryption and decryption of the program key; and
        b) providing the service key in the EMM.

14. The method of claim 13, wherein responsive to the subscription-service access request, the step of providing the first ECM further includes:
    c) providing subscription-service access rules for the subscription-service access in the first ECM;
    d) encrypting a second copy of the program key with the service key;
    e) providing the second copy of the program key in the first ECM; and
    f) providing a second MAC for at least the subscription service access rules and the second copy of the program key, the second copy of the program key is operable for decrypting the content for the subscription-service access and deriving the second MAC.

15. The method of claim 11, wherein the step of providing PPV access rules for the PPV access request in the first ECM comprises the steps of:
    providing a predetermined subset of the PPV access rules for the PPV access request in the first ECM at a first rate; and
    providing a remainder of the PPV access rules in the first ECM at a rate slower than the rate of providing the predetermined subset of the PPV access rule.

16. The method of claim 11, further comprising the steps of:
    receiving a roaming request for the content, wherein the roaming request is a roaming PPV access request or a roaming subscription-service access request; and
    responsive to the roaming request, providing a roaming device unit key that is unique to a source of the roaming request.

17. The method of claim 16, further comprising the step of:

responsive to the roaming request being the roaming PPV access request, providing a roaming ECM, the step of providing the roaming ECM includes,
  a) encrypting a roaming program key with the roaming device unit key, the roaming program key is operable for decrypting the content for the PPV access request through roaming; and
  b) providing the roaming program key in the roaming ECM.

18. The method of claim 16, further comprising the step of:

responsive to the roaming request being the subscription-service access request, providing a roaming EMM, wherein the step of providing the roaming EMM includes,
  c) encrypting a roaming service key with at least the roaming device unit key; and
  d) providing the roaming service key in the roaming EMM.

19. The method of claim 18, further comprising the step of:

responsive to the roaming request being the subscription-service access request, providing a roaming ECM, the step of providing the roaming ECM includes,
  a) encrypting a roaming program key with the roaming service key, the roaming program key is operable for decrypting the content for the subscription service access through roaming; and
  b) providing the roaming program key in the roaming ECM.

20. The method of claim 11, further comprising the step of:

providing an entitlement management message (EMM) that includes a free-preview program key, wherein the free-preview program key is operable to enable a free preview of the content by the PPV access request.

\* \* \* \* \*